US009822217B2

(12) United States Patent
Faucher et al.

(10) Patent No.: US 9,822,217 B2
(45) Date of Patent: *Nov. 21, 2017

(54) ROBUST RESIN FOR SOLVENT-FREE EMULSIFICATION

(75) Inventors: Santiago Faucher, Oakville (CA); Guerino G. Sacripante, Oakville (CA); Shigang S. Qiu, Toronto (CA); Allan K. Chen, Oakville (CA); Jordan H. Wosnick, Toronto (CA)

(73) Assignee: Xerox Corporation, Norwalk, CT (US)

( * ) Notice: Subject to any disclaimer, the term of this patent is extended or adjusted under 35 U.S.C. 154(b) by 552 days.

This patent is subject to a terminal disclaimer.

(21) Appl. No.: 13/423,851

(22) Filed: Mar. 19, 2012

(65) Prior Publication Data

US 2013/0245197 A1    Sep. 19, 2013

(51) Int. Cl.
  *C08L 13/02*   (2006.01)
  *C08G 63/12*   (2006.01)
  *C08G 63/78*   (2006.01)

(52) U.S. Cl.
  CPC ............. *C08G 63/12* (2013.01); *C08G 63/78* (2013.01)

(58) Field of Classification Search
  CPC ...... C08G 63/78; C08G 63/133; C08G 63/12; C08L 13/02; G03G 9/08755; G03G 9/08797; G03G 9/0804
  See application file for complete search history.

(56) References Cited

U.S. PATENT DOCUMENTS

| | | | |
|---|---|---|---|
| 4,298,672 A | 11/1981 | Lu | |
| 4,338,390 A | 7/1982 | Lu | |
| 4,960,664 A * | 10/1990 | Yamada et al. | ............ 430/109.4 |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,723,253 A | 3/1998 | Higashino et al. | |
| 5,744,520 A | 4/1998 | Kmiecik-Lawrynowicz et al. | |
| 5,747,215 A | 5/1998 | Ong et al. | |
| 5,763,133 A | 6/1998 | Ong et al. | |
| 5,766,818 A | 6/1998 | Smith et al. | |
| 5,804,349 A | 9/1998 | Ong et al. | |
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,863,698 A | 1/1999 | Patel et al. | |
| 5,869,215 A | 2/1999 | Ong et al. | |
| 5,902,710 A | 5/1999 | Ong et al. | |
| 5,910,387 A | 6/1999 | Mychajilowskij et al. | |
| 5,916,725 A | 6/1999 | Patel et al. | |
| 5,919,595 A | 7/1999 | Mychajilowskij et al. | |
| 5,925,488 A | 7/1999 | Patel et al. | |
| 5,977,210 A | 11/1999 | Patel et al. | |
| 5,994,020 A | 11/1999 | Patel et al. | |
| 6,291,122 B1 * | 9/2001 | Sacripante et al. | ........ 430/109.4 |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 8,076,048 B2 | 12/2011 | Sacripante et al. | |
| 2004/0142266 A1 * | 7/2004 | Sacripante et al. | ........ 430/109.3 |
| 2008/0107989 A1 | 5/2008 | Sacripante et al. | |
| 2008/0153027 A1 | 6/2008 | Veregin et al. | |
| 2008/0182193 A1 * | 7/2008 | Agur et al. | ................ 430/109.4 |
| 2009/0061349 A1 * | 3/2009 | Sacripante et al. | ...... 430/137.14 |
| 2009/0208864 A1 * | 8/2009 | Zhou et al. | ............ 430/137.14 |
| 2010/0021841 A1 * | 1/2010 | Sacripante et al. | ...... 430/137.14 |
| 2011/0027710 A1 | 2/2011 | Faucher et al. | |
| 2011/0028620 A1 * | 2/2011 | Faucher et al. | ................ 524/158 |
| 2011/0313079 A1 * | 12/2011 | Lincoln et al. | ................ 523/351 |
| 2012/0189956 A1 | 7/2012 | Chen et al. | |
| 2013/0244151 A1 * | 9/2013 | Chen et al. | ................... 430/105 |
| 2013/0245197 A1 * | 9/2013 | Faucher et al. | ................ 524/601 |

OTHER PUBLICATIONS

Office Action in Canadian Patent Application No. 2,808,973, dated Feb. 4, 2014, 2 pages.
Allan K. Chen, et al., U.S. Appl. No. 13/423,820, filed Mar. 19, 2012, "Chemical Toner Including a Robust Resin for Solvent-Free Emulsification," not yet published, 50 pages.

* cited by examiner

*Primary Examiner* — Michael A Salvitti
(74) *Attorney, Agent, or Firm* — Maylour J. Lovoie, Esq. LLC

(57) ABSTRACT

A branched polyester suitable for use in solvent-free emulsification, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the branched polyester comprises a compound of the formula described.

11 Claims, No Drawings

ROBUST RESIN FOR SOLVENT-FREE EMULSIFICATION

RELATED APPLICATIONS

Commonly assigned U.S. patent application Ser. No. 13/423,820, entitled "Chemical Toner Including A Robust Resin For Solvent-Free Emulsification", of Allan K. Chen, Santiago Faucher, Guerino Sacripante, and Shigang S. Qiu, filed concurrently herewith, is hereby incorporated by reference herein in its entirety.

BACKGROUND

Disclosed herein is a robust branched polyester resin that exhibits little to no degradation in solvent-free emulsification processes. Further disclosed is a branched polyester and process for preparing same, the branched polyester containing at least one of alcohol-derived branching sites or acid-derived branching sites that limit or prevent altogether degradation of the polyester during solvent-free emulsification processes such that the polyester exhibits less than about 20 percent molecular weight degradation following solvent-free emulsification. Further disclosed is a solvent-free emulsification process for preparing polyester latex wherein the polyester is the robust branched polyester described herein. Still further disclosed is a polyester latex prepared by a solvent-free emulsification process wherein the polyester is the robust branched polyester described herein.

There are many applications for polyester dispersions in the coatings and pharmaceutical industries. Examples of materials for which polyester dispersions can be required include paints, varnishes, powdered coatings, pharmaceutical additives, pressure sensitive adhesives, raw materials for toners, and raw materials for inks. Currently most polyester latexes are produced by a solvent-based approach which is not cost-effective, not environmentally friendly, and leaves undesirable amounts of solvent in the latex.

A solvent-free emulsification process has been developed that is cost effective, environmentally friendly, and produces latexes with no residual solvent. U.S. Patent Publication 2011/0028620A1, of Santiago Faucher, et al., entitled "Processes For Producing Polyester Latexes Via Solvent-Free Emulsification," which is hereby incorporated by reference herein in its entirety, describes in the Abstract thereof a process for making a latex emulsion suitable for use in a toner composition including contacting a resin with a solid neutralizing agent in the absence of an organic solvent to form a mixture either via a co-feeding process or a pre-blend mixture, and adding a solid or aqueous surfactant to the pre-blend mixture or prior to melt mixing the mixture.

However, not all polyesters can be converted into latexes in a solvent-free process because certain polyesters suffer degradation in molecular weight as a result of the process. Previous toners comprising selected polyesters that account for about 60% of the toner particle mass can be emulsified by solvent-free emulsification without causing severe degradation of the polyester resin (that is, without causing a severe reduction of the molecular weight of the resin by chain scission events). Certain polyesters, however, degrade heavily, exhibiting, for example, a greater than about 60% decrease in molecular weight in a solvent-free process. It was originally believed that the higher molecular weight of these resins was the cause of degradation.

Solvent-free emulsification can provide an important, financially advantageous method for dispersion preparation. This is because the current solvent-based phase inversion emulsification process costs are high and equivalent to those of the resin itself. New resin designs that permit solvent-free emulsification are therefore highly desirable and will find applications for toners and in other fields of use.

Currently available resins are suitable for their intended purposes. However a need remains for an improved, robust, resin. Further, a need remains for polyester resins that exhibit minimal or zero degradation in solvent-free emulsification processes. Further, a need remains for polyester resins that exhibit minimal or zero degradation in solvent-free emulsification processes and resin dispersions (latexes) produced therefrom through solvent-free emulsification processes which resins can be used in a wide variety of industrial and other applications.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a branched polyester suitable for use in solvent-free emulsification, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the polyester comprises a compound of the formula:

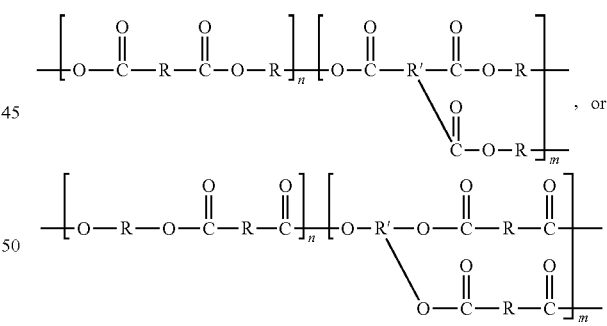

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000.

Also described is a process for preparing a branched polyester suitable for use in solvent-free emulsification processes, wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification, comprising contacting at least one branching agent with at least one diacid, at least one diester, or a mixture or combination thereof, and reacting same to produce a branched polyester; wherein the at least one branching agent is sufficient to provide at least one of alcohol-derived branching sites or acid-derived branching sites to the polyester that limit or prevent altogether degradation of the polyester during solvent-free emulsification processes such that the branched polyester exhibits less than about 20 percent molecular weight degradation following solvent-free emulsification.

Also described is a solvent-free emulsification process for preparing polyester latex comprising contacting a branched polyester with a solid neutralizing agent in the absence of an organic solvent to form a pre-blend mixture; melt mixing the mixture; contacting the melt mixed mixture with deionized water to form an oil in water emulsion; optionally, recovering polyester latex particles; wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification.

Also described is a polyester latex prepared by a solvent-free emulsification process comprising contacting a branched polyester with a solid neutralizing agent in the absence of an organic solvent to form a pre-blend mixture; melt mixing the mixture; contacting the melt mixed mixture with deionized water to form an oil in water emulsion; optionally, recovering polyester latex particles; wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification.

DETAILED DESCRIPTION

The present disclosure describes a polyester suitable for use in solvent-free emulsification processes. Not all polyesters can be converted into latexes in a solvent-free process because certain polyesters suffer degradation in molecular weight as a result of the process. Polyesters can degrade heavily, exhibiting, for example, a greater than about 60% decrease in molecular weight in a solvent-free process. It was previously believed that the higher molecular weight of these resins was the cause of degradation. The present inventors have surprisingly discovered that it is in fact the branching agent (for example, trimellitic anhydride, TMA) in the resin that is the cause of the molecular weight degradation. In the present disclosure, robust polyester resins are provided that overcome this degradation mechanism during solvent-free emulsification.

Weight average molecular weight is a common term in the art of polymer science that describes the molecular weight of a polymer. Weight average molecular weight refers to an average that is weighted by mass rather than number. See, http://web.mst.edu/~wlf/mw/definitions.html. Also, see http://en.wikipedia.org/wiki/Molar_mass_distribution#Weight_average_molecular_weight. For example, weight average molecular weight can be calculated by the formula $$M_w = \sum_i N_i M_i^2 = \sum_i w_i M_i$$

$$\sum_i N_i M_i = \sum_i w_i$$

wherein $M_w$ is weight average molecular weight, $N_i$ is the number of molecules of molecular weight $M_i$. Weight average molecular weight can be determined by a number of methods as is known in the art including light scattering, small angle neutron scattering, X-ray scattering, and sedimentation velocity.

Solvent-free emulsification can provide an important, financially advantageous method for toner preparation. This is because the current solvent-based phase inversion emulsification process costs are high and equivalent to those of the resin itself. The instant novel resin designs permit solvent-free emulsification and are therefore highly desirable and will find applications for toners and in other fields of use.

In embodiments, a branched polyester is provided that is suitable for use in solvent-free emulsification processes, wherein the branched polyester contains at least one of alcohol-derived branching sites or acid-derived branching sites that limit or prevent altogether degradation of the polyester during solvent-free emulsification processes such that the polyester resin exhibits less than about 20 percent molecular weight degradation following solvent-free emulsification, less than about 15 percent molecular weight degradation following solvent-free emulsification, less than about 12 percent molecular weight degradation following solvent-free emulsification, or is essentially free of molecular weight degradation following solvent-free emulsification.

In embodiments, a branched polyester suitable for use in solvent-free emulsification is provided, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the polyester comprises a compound of the formula:

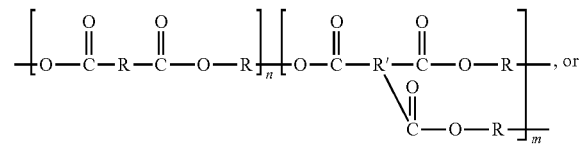

-continued

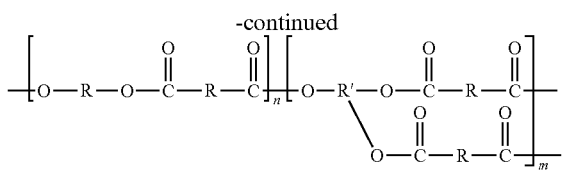

wherein R is an alkylene group (wherein an alkylene group is defined as a divalent aliphatic group or alkyl group, and wherein the alkylene group can be selected from linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), having from about 1 to about 100 carbon atoms, or from about 1 to about 50 carbon atoms, or from about 1 to about 12 carbon atoms, although the number of carbon atoms can be outside of these ranges;

wherein R' is an alkylene group (wherein an alkylene group is defined as a divalent aliphatic group or alkyl group, and wherein the alkylene group can be selected from linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), having from about 1 to about 100 carbon atoms, or from about 1 to about 50 carbon atoms, or from about 1 to about 12 carbon atoms, although the number of carbon atoms can be outside of these ranges;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000.

In further embodiments, a process for preparing a branched polyester suitable for use in solvent-free emulsification processes is provided, wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification, comprising contacting at least one branching agent with at least one diacid, at least one diester, or a mixture or combination thereof, and reacting same to produce a branched polyester; wherein the at least one branching agent is sufficient to provide at least one of alcohol-derived branching sites or acid-derived branching sites to the polyester that limit or prevent altogether degradation of the polyester during solvent-free emulsification processes such that the branched polyester exhibits less than about 20 percent molecular weight degradation following solvent-free emulsification.

In further embodiments, a solvent-free emulsification process for preparing polyester latex is provided comprising contacting a branched polyester with a solid neutralizing agent in the absence of an organic solvent to form a pre-blend mixture; melt mixing the mixture; contacting the melt mixed mixture with deionized water to form an oil in water emulsion; optionally, recovering polyester latex particles; wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification.

In further embodiments, a polyester latex prepared by a solvent-free emulsification process is provided comprising contacting a branched polyester with a solid neutralizing agent in the absence of an organic solvent to form a pre-blend mixture; melt mixing the mixture; contacting the melt mixed mixture with deionized water to form an oil in water emulsion; optionally, recovering polyester latex particles; wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification.

As used herein, "the absence of an organic solvent" means that organic solvents are not used to dissolve the resin or neutralizing agent for emulsification. However, it is understood that minor amounts of such solvents may be present in such resins as a consequence of their use in the process of forming the resin.

The novel branched polyester resin designs described herein are suitable for numerous uses including for use in the coatings, printing and marking industries. The branched polyester resins herein are robust and resist degradation when dispersed by solvent-free emulsification processes such as in an extruder.

Branching Agents.

In embodiments, the branched polyester herein contains alcohol-derived branching sites that limit or prevent altogether degradation of the polyester during solvent-free emulsification. In embodiments, the branched polyester herein is prepared using polyols as branching monomers, in embodiments, using polyols having three or more —OH groups as branching monomers. In certain embodiments, the branched polyester contains three or more alcohol-derived branching sites.

Previously, such polyester resins were prepared using certain poly-acids as branching monomers that resulted in carbonyl carbons in the polyester backbone being separated by less than two atoms covalently linked by single bonds or that resulted in carbonyl carbons in the polyester backbone being separated by less than three atoms covalently linked by at least one double bond. Problematically, these previous polyesters are known to degrade when subjected to solvent-free emulsification processes. When certain poly-acids are used as branching monomers, two ester linkages are adjacent to one another in the backbone of the polymer. Once one of the ester linkages has been hydrolyzed, it can participate in a co-operative hydrolysis reaction that makes the second hydrolysis much faster.

Degradation of polyester resins during solvent-free emulsification processes can be problematic. In embodiments, a solvent-free emulsification process can include feeding a polyester resin and a base (such as NaOH) as powders into an extruder using gravimetric feeders. In the extruder, these materials melt mix up to the point where a surfactant solution is added. The solution mixes with the molten polymer to form a water-in-oil dispersion. The base neutralizes acid end groups on the polyester to form anionic species that help stabilize this emulsion. The surfactant further provides stabilization of the emulsion. Upon the addition of more water, the water-in-oil emulsion inverts to an oil-in-water emulsion (polyester resin in water latex/dispersion).

This latex material exits the extruder die and is collected for later use which can include any suitable or desired application including, but not limited to, use in preparing emulsion aggregation toners. While the base is needed for the emulsification to proceed, the base can, as a side effect, work to degrade the resin. The present inventors have found that branched resins that use certain triacids are highly susceptible to degradation. The present inventors have discovered that the use of poly-acids that result in carbonyl carbons in the polyester backbone being separated by less than two atoms covalently linked by single bonds or that result in carbonyl carbons in the polyester backbone being separated by less than three atoms covalently linked by at least one double bond create the potential for co-operative hydrolysis reactions that makes the degradation process much faster.

In embodiments, the polyester herein contains acid-derived branching sites that limit or prevent altogether degradation of the polyester during solvent-free emulsification. In such embodiments, acid branching agents are selected wherein the acid groups are far enough apart to prevent or eliminate altogether undesired neighboring group reactions. In embodiments, the acid branching agents are selected from the group consisting of tri-acids, tetra-acids, and the like, wherein the acid groups are sufficiently far apart to prevent or eliminate altogether undesired neighboring group reactions.

In embodiments, branching is by preparing the branched polyester with an acid monomer having three or more carboxylic acid groups.

In embodiments, branching is achieved by preparing the branched polyester with an acid monomer selected from the group consisting of trimesic acid, biphenyl-3,4',5-tricarboxylic acid, 1,3,5-trimethylcyclohexane-1,3,5-tricarboxylic acid, cyclohexane-1,3,5-tricarboxylic acid, biphenyl-3,3',5,5'-tetracarboxylic acid, citric acid, tricarboxylic acid, butanetricarboxylic acid, nitrilotriacetic acid, and mixtures and combinations thereof.

In other embodiments, the polyester resin herein contains both acid-derived branching sites and alcohol-derived branching sites that limit or prevent altogether degradation of the polyester during solvent-free emulsification processes.

In embodiments, the branched polyester contains acid-derived branching sites that limit or prevent altogether degradation of the polyester during solvent-free emulsification processes; wherein the branched polyester contains alcohol-derived branching sites that limit or prevent altogether degradation of the polyester during solvent-free emulsification processes; or wherein the branched polyester contains a combination of acid-derived branching sites and alcohol-derived branching sites that limit or prevent altogether degradation of the polyester during solvent-free emulsification processes.

Therefore, a novel branched polyester is provided, in embodiments, for use in latex preparation by solvent-free emulsification wherein the branched polyester contains alcohol-derived branching sites that limit the degradation of the polyester during the solvent-free emulsification process, acid-derived branching sites that limit the degradation of the polyester during the solvent-free emulsification process, or a combination of alcohol-derived and acid-derived branching sites that limit the degradation of the polyester during the solvent-free emulsification process.

In embodiments, the branched polyester resin is a compound of the formula described hereinabove.

In certain embodiments, the branched polyester resin is a compound of the formula

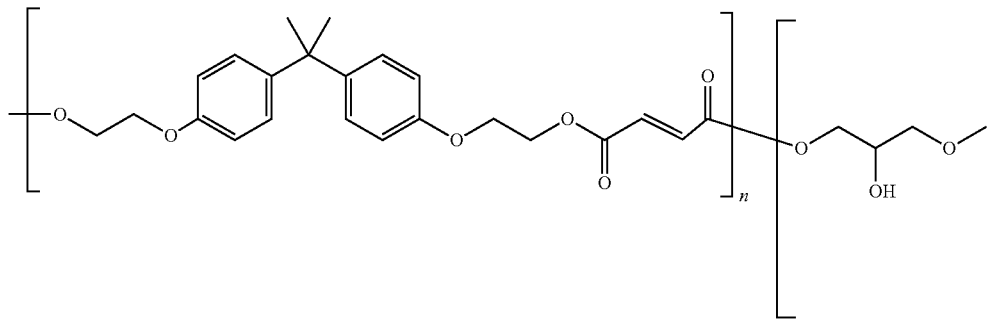

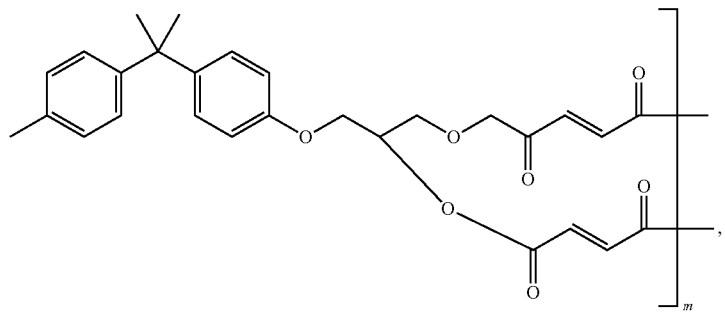

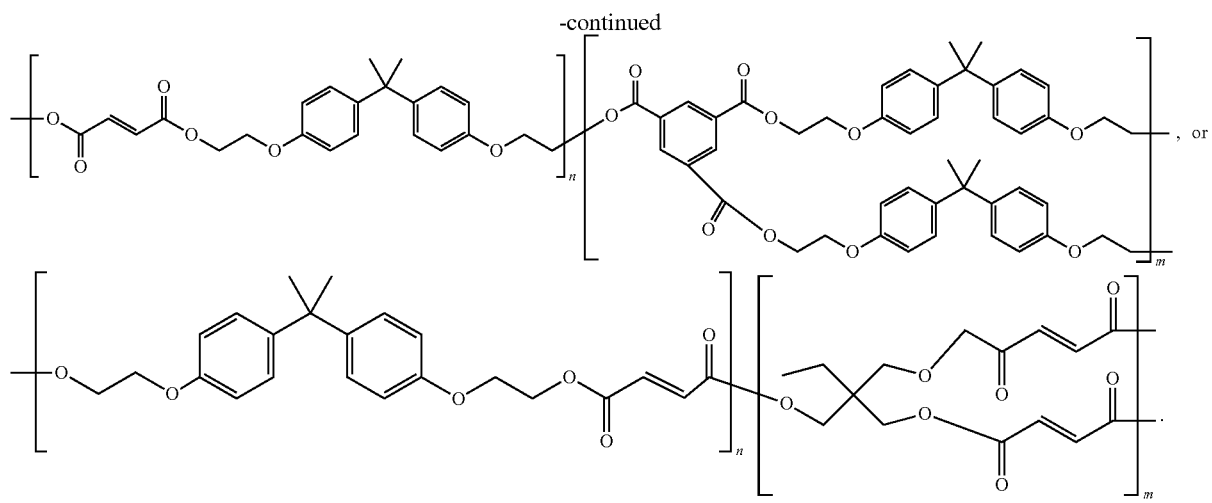
, or

In embodiments, the branched polyester contains branching sites derived from an alcohol branching monomer having three or more hydroxyl groups.

In embodiments, the branched polyester herein is prepared using a polyol branching agent. In embodiments, the polyol branching agent is a branching monomer having three or more alcohol branching sites, that is, three or more —OH groups. In embodiments, a branched polyester is provided wherein the branching monomer is glycoxylated bisphenol A. In embodiments, the alcoholic branching sites in the polyester resin are derived from glycoxylated bisphenol-A, glycerine-modified bisphenol-A derivatives, glycerine, pentaerythritol, trimethylolpropane, mannitol, sorbitol, xylitol, glucose, fructose, sucrose, and mixtures and combinations thereof; and the polyester resin contains a portion derived from a diacid or diester selected from the group consisting of terephthalic acid, phthalic acid, isophthalic acid, fumaric acid, trimellitic acid, dimethylfumarate, dimethylitaconate, cis-1,4-diacetoxy-2-butene, diethyl fumarate, diethyl maleate, maleic acid, succinic acid, itaconic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures and combinations thereof.

In embodiments, the branching agent can be prepared from the reaction of glycerine carbonate and bisphenol-A in the presence of a potassium carbonate catalyst as per Scheme 1, below.

Scheme 1: Synthesis of
glycoxylated bisphenol-A branching monomer by carbonate route

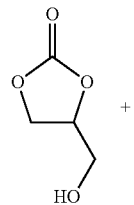

+

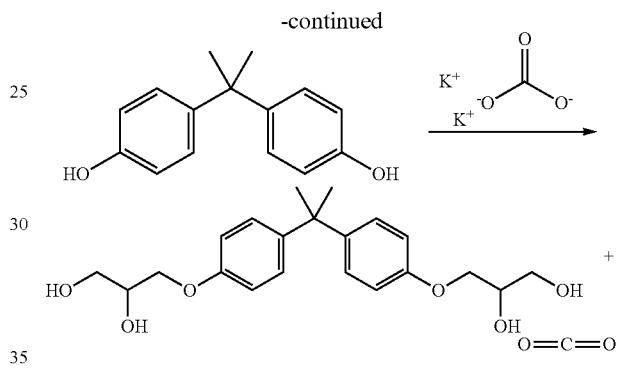

In specific embodiments, the alcoholic branching monomers herein can be selected from the group consisting of glycoxylated bisphenol-A, glycerine-modified bisphenol-A derivatives, glycerine, pentaerythritol, trimethylolpropane, mannitol, sorbitol, xylitol, glucose, fructose, sucrose, and mixtures and combinations thereof.

In embodiments, propoxylated bisphenol-A and ethoxylated bisphenol-A can be prepared from propylene carbonate and ethylene carbonate, respectively, using the carbonate route outlined in Scheme 1.

Robust Resin Prepared with Branching Monomer.

The robust branched polyester resin herein can be prepared by any suitable or desired method. In embodiments, the robust branched polyester herein can be prepared by combining one or more branching monomers with one or more diesters or diacids in the presence of an optional catalyst to produce a branched polyester containing a portion derived from a diacid or diester. In embodiments, the branched polyester contains a portion derived from a diacid or diester selected from the group consisting of terephthalic acid, phthalic acid, isophthalic acid, fumaric acid, trimellitic acid, dimethylfumarate, dimethylitaconate, cis-1,4-diacetoxy-2-butene, diethyl fumarate, diethyl maleate, maleic acid, succinic acid, itaconic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures and combinations thereof.

In embodiments, a process for preparing a polyester resin suitable for use in solvent-free emulsification processes, wherein the polyester resin contains at least one of alcohol-derived branching sites or acid-derived branching sites that limit or prevent altogether degradation of the polyester during solvent-free emulsification processes such that the polyester resin exhibits less than about 20 percent molecular weight degradation following solvent-free emulsification, comprises contacting at least one branching agent with at least one diacid, at least one diester, or a mixture or combination thereof, and reacting same to produce a polyester resin; wherein the at least one branching agent is sufficient to provide at least one of alcohol-derived branching sites or acid-derived branching sites to the polyester resin that limit or prevent altogether degradation of the polyester during solvent-free emulsification processes such that the polyester resin exhibits less than about 20 percent molecular weight degradation following solvent-free emulsification.

As described herein, the branching agent can contain alcohol branching sites that limit or prevent altogether degradation of the polyester during solvent-free emulsification processes, in embodiments, the branching agent can contain three or more alcohol branching sites.

Resin Monomers.

Any suitable or desired resin monomers can be used in the processes herein. In embodiments, the resin can be an amorphous resin, a crystalline resin, or a mixture or combination thereof. In further embodiments, the resin can be a polyester resin, including the resins described in U.S. Pat. No. 6,593,049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

For forming a crystalline polyester, one or more polyol branching monomers as described above can be reacted with a diacid in the presence of an optional catalyst and a further organic diol suitable for forming the crystalline resin including aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers. The aliphatic diol may be present in any suitable or desired amount, such as from about 25 to about 60 mole percent, or from about 25 to about 55 mole percent, or from about 25 to about 53 mole percent of the resin. In embodiments, a third diol can be selected from the above-described diols in an amount of from about 0 to about 25 mole percent, or from about 1 to about 10 mole percent of the resin.

Examples of organic diacids or diesters including vinyl diacids or vinyl diesters that can be selected for the preparation of the robust crystalline resin herein include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof. The organic diacid can be present in any suitable or desired amount, in embodiments, from about 25 to about 60 mole percent, or from about 25 to about 52 mole percent, or from about 25 to about 50 mole percent. In embodiments, a second diacid can be selected from the above-described diacids and can be present in an amount of from about 0 to about 25 mole percent of the resin.

The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

For forming crystalline polyester, one or more polyacid branching monomers as described above can be reacted with a diol in the presence of an optional catalyst and a further organic diacid or diester as described above. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

The robust resin herein can be an amorphous resin. Examples of diacids or diesters suitable for use in forming the resin herein include vinyl diacids or vinyl diesters used for the preparation of amorphous polyester resins including dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof.

The organic diacid or diester may be present in any suitable or desired amount, such as from about 35 to about 60 mole percent of the resin, or from about 42 to about 52 mole percent of the resin, or from about 45 to about 50 mole percent of the resin.

Examples of diols which may be used to prepared the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and mixtures and combinations thereof.

The organic diol can be present in any suitable or desired amount, such as from about 35 to about 60 mole percent of the resin, or from about 42 to about 55 mole percent of the resin, or from about 45 to about 53 mole percent of the resin.

For forming amorphous polyester, one or more polyacid branching monomers as described above can be reacted with a diol as described above in the presence of an optional catalyst and a further organic diacid or diester as described above. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

For forming amorphous polyester, one or more polyol branching monomers as described above can be reacted with a diacid as described above in the presence of an optional catalyst and a further organic diol as described above. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

Polycondensation Catalyst.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

As noted, the robust resin can be prepared by any suitable or desired method. For example, one or more branching monomers as described herein can be combined with one or more acid or diester components in the optional presence of a catalyst, heated, optionally in an inert atmosphere, to condense the monomers into prepolymers. To this mixture can be added one or more diacids or diesters, optionally additional catalyst, optionally a radical inhibitor, with heating, optionally under inert atmosphere, to form the desired final robust branched resin (polyester).

Heating can be to any suitable or desired temperature, such as from about 140° C. to about 250° C., or about 160° C. to about 230° C., or about 180° C. to about 220° C.

Any suitable inert atmosphere conditions can be selected, such as under nitrogen purge.

If desired, a radical inhibitor can be used. Any suitable or desired radical inhibitor can be selected, such as hydroquinone, toluhydroquinone, 2,5-DI-tert-butylhydroquinone, and mixtures and combinations thereof. The radical inhibitor can be present in any suitable or desire amount, such as from about 0.01 to about 1.0, about 0.02 to about 0.5, or from about 0.05 to about 0.2 weight percent of the total reactor charge In certain embodiments, 12.6 grams glycoxylated bisphenol-A branching monomer can be combined with 273.1 grams propoxylated bisphenol-A and 140.7 grams ethoxylated bisphenol-A, 130.4 grams terephthalic acid, and 3 grams of (butyl(hydroxy)stannanone) tin catalyst into a reactor and heated to 260° C. under nitrogen purge in order to condense the monomers into prepolymers. To this mixture can be added 92.1 grams dodecylsuccinic anhydride monomer and 22.1 grams fumaric acid monomer, 1 gram additional (butyl(hydroxy)stannanone) tin catalyst, and 1 gram of hydroquinone (a radical inhibitor). The monomers can be heated to 205° C. with nitrogen purge to condense and form the desired final robust branched resin (polyester).

Neutralizing Agent.

In embodiments, the robust resin herein can be pre-blended with a weak base or neutralizing agent. In embodiments, the base can be a solid, thereby eliminating the need to use a solution, which avoids the risks and difficulties associated with pumping a solution.

In embodiments, the robust resin herein and the neutralizing agent can be simultaneously fed through a co-feeding process which may accurately control the feed rate of the neutralizing agent and the robust resin into an extruder and which may then be melt mixed followed by emulsification.

In embodiments, the neutralizing agent can be used to neutralize acid groups in the resins. Any suitable or desired neutralizing agent can be selected. In embodiments, the neutralizing agent can be selected from the group consisting of ammonium hydroxide, potassium hydroxide, sodium hydroxide, sodium carbonate, sodium bicarbonate, lithium hydroxide, potassium carbonate, and mixtures and combinations thereof.

The neutralizing agent can be used as a solid, such as sodium hydroxide flakes, etc., in an amount of from about 0.001% to about 50% by weight, or from about 0.01% to about 25% by weight, or from about 0.1% to about 5% by weight, based on the weight of the resin.

In certain embodiments, the neutralizing agent is a solid neutralizing agent selected from the group consisting of ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and mixtures and combinations thereof.

In embodiments, the neutralizing agent can be sodium hydroxide flakes. In embodiments, the surfactant used can be an aqueous solution of alkyldiphenyloxide disulfonate to ensure that proper resin neutralization occurs when using sodium hydroxide flakes and leads to a high quality latex with low coarse content. Alternatively, a solid surfactant of sodium dodecyl benzene sulfonate can be used and co-fed with the resin into the extruder feed hopper eliminating the need to use a surfactant solution thereby providing a simplified and efficient process.

An emulsion formed in accordance with the present process can also include a small amount of water, in embodiments, deionized water, in any suitable or desired amount, such as from about 20% to about 300%, or from about 30% to about 150%, by weight of the resin, at temperatures that melt or soften the resin, such as from about 40° C. to about 140° C., or from about 60° C. to about 100° C.

Surfactant.

The process herein can include adding a surfactant to the resin before or during the melt mixing, at an elevated temperature. In embodiments, the surfactant can be added prior to melt-mixing the resin at an elevated temperature. In embodiments, a solid surfactant can be co-fed with the resin and the neutralizing agent into the extruder. In embodiments, a solid surfactant can be added to the resin and neutralizing agent to form a pre-blend mixture prior to melt mixing. Where surfactants are used, the resin emulsion may include one, two, or more surfactants. The surfactant can be selected from ionic surfactants and nonionic surfactants. Ionic surfactants can include anionic surfactants and cationic surfactants. The surfactant can be added as a solid or as a solution in any suitable or desired amount, such as a solution with a concentration of about 5% to about 80% by weight, or from about 10% to about 60% by weight. In embodiments, the surfactant can be present in an amount of from about 0.01% to about 20%, or from about 0.1% to about 16%, or from about 1% to about 14%, by weight of the resin.

Any suitable or desired surfactant can be selected for use herein. In embodiments, the surfactant can be selected from the group consisting of sodium dodecylsulfates, sodium dodecylbenzene sulfonates, sodium dodecylnaphthalene sulfate, dialkyl benzenealkyl sulfates, dialkylbenzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleylether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecyl benzyl triethyl ammonium chloride, cetyl pyridinium bromide, and mixtures and combinations thereof.

As noted above, the process herein can include melt mixing at an elevated temperature a mixture containing the robust resin described herein, a solid or aqueous surfactant, and a solid neutralizing agent, wherein an organic solvent is not used in the process, to form a latex emulsion wherein the robust resin is resistant to degradation. In embodiments, the robust resin and the neutralizing agent can be pre-blended prior to melt mixing. In embodiments, the robust resin can be co-fed into a screw feeder with the solid neutralizing agent.

Additional Resin.

More than one resin can be used to form the latex herein. The robust resin can be an amorphous resin, a crystalline resin, or a combination thereof. In embodiments, the robust resin can be an amorphous resin and the elevated temperature can be a temperature above the glass transition temperature of the amorphous resin. In other embodiments, the robust resin can be a crystalline resin and the elevated temperature can be a temperature above the melting point of the crystalline resin. In further embodiments, the robust resin can be a mixture of amorphous and crystalline resins and the temperature can be above the glass transition temperature of the mixture.

In embodiments, the surfactant can be added to the one or more components of the resin composition before during, or after melt-mixing. In embodiments, the surfactant can be added before, during, or after the addition of the neutralizing agent. In embodiments, the surfactant can be added prior to the addition of the neutralizing gent. In embodiments, a solid surfactant can be added to the pre-blend mixture prior to melt mixing.

The elevated temperature can be any suitable or desired temperature, in embodiments, from about 30° C. to about 300° C., or from about 50° C. to about 200° C., or from about 70° C. to about 150° C.

Melt mixing can be conducted in an extruder, such as a twin screw extruder, a kneader, such as a Haake mixer, a batch reactor, or any other device capable of intimately mixing viscous materials to create near homogenous mixtures.

Optionally, stirring can be used to enhance formation of the latex. Any suitable stirring device can be used. In embodiments, stirring may be at from about 10 revolutions per minute (rpm) to about 5,000 rpm, or from about 20 rpm to about 2,000 rpm, or from about 50 rpm to about 1,000 rpm. The stirring need not be at a constant speed, but may be varied. For example, as the heating of the mixture because more uniform, the stirring rate can be increased.

Once the robust resin, neutralizing agent, and surfactant are melt mixed, the mixture can be contacted with water to form a latex emulsion. Water can be added so as to form a latex with any suitable or desired solids content, such as from about 5% to about 80% or from about 10% to about 40%. While higher water temperatures can accelerate the dissolution process, latexes can be formed at temperatures as low as room temperature. In embodiments, water temperatures can be from about 40° C. to about 150° C. or from about 50° C. to about 100° C.

Contact between the water and the robust resin mixture can be by any suitable manner such as in a vessel or continuous conduit or in a packed bed. The process described in U.S. Patent Publication 2011/0028620A1, which is hereby incorporated by reference herein in its entirety, can be used for the robust resin latex herein.

The latex herein can be prepared in an extruder and the product exiting the extruder can include a stream of latex that is collected and stored for later use such as in an aggregation/coalescence toner process.

The particle size of the latex emulsion formed can be controlled by the concentration ratio of surfactant and neutralizing agent to robust polyester resin. The solids concentration of the latex can be controlled by the ratio of the robust resin mixture to water.

The emulsified resin particles in the aqueous medium can have a size of from about 1,500 nanometers or less, such as from about 10 nanometers to about 1,200 nanometers, or from about 30 nanometers to about 1,000 nanometers.

The particle size distribution of a latex herein can be from about 60 nanometers to about 300 nanometers, or from about 125 nanometers to about 200 nanometers.

The coarse content of the latex herein can be from about 0 to about 5% of the solids content of the latex. Coarse content meaning any solid material being retained by a 20 μm sieve.

The solids content of the latex herein can be from about 5% to about 80% or from about 30% to about 40% by weight based on the total weight of the latex.

The latex emulsions herein can be used for any suitable or desired application. In embodiments, the latex emulsions herein can be used to produce particle sizes that are suitable for emulsion aggregation ultra low melt processes including toner processes using the robust resin described herein.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Comparative Example 1A

Comparative Resin 1A with trimellitic anhydride used as a branching monomer. To a 1 Liter resin kettle was added 22.1 grams of trimellitic anhydride, 126.9 grams of dodecenylsuccinic anhydride, 113.0 grams of terephthalic acid, 371.8 grams of propoxylated bisphenol-A and 60.3 grams of ethoxylated bisphenol-A, and 1.35 grams of (butyl(hydroxy) stannanone) tin catalyst into a reactor and heated to 230° C. under nitrogen purge in order to condense the monomers into a polymer.

Comparative Example 1B

Comparative Resin 1B Latex. Resin 1A of Comparative Example 1A was emulsified via a solvent-free process comprising blending 100 grams of resin with sodium dodecyl benzene sulfonate (SDBS, 10 grams) and sodium hydroxide (NaOH, 1 gram). This mixture was then fed into an extruder at a rate of 15 grams/minute. The material melt-mixed in the first zone of the extruder at a temperature of 150° C. and then entered a second zone at 95° C. where water was pumped in through an injection nozzle at a rate of 30 grams/minute. These two streams were mixed in a Leistritz Micro-18 extruder to form a water-in-oil emulsion and later an oil-in-water emulsion. The latex was collected in a receiving tank for analysis. Latex samples were dried overnight and submitted to determine the resin molecular weight by gel permeation chromatography relative to polystyrene standards used to form the calibration curve of the chromatograph. The weight and number average molecular weights of the resin prior to dispersion were 129,500 and 5,300 grams/mol respectively. The dried latex had weight and number average molecular weight of 62,800 and 3,800 grams/mol respectively. Therefore the resin weight average molecular weight degraded from 129,500 to 62,800 grams/mol during the solvent-free emulsification process which represents a 52% reduction in weight average molecular weight of the resin.

Example 1

Robust Branched Resin.

Glycoxylated bisphenol-A, propoxylated bisphenol-A and ethoxylated bisphenol-A were prepared from glycerine carbonate, propylene carbonate and ethylene carbonate, respectively, using the carbonate route outlined in Scheme 1 described herein.

Glycoxylated bisphenol-A was prepared by combining 9.68 kilograms glycerine carbonate sourced from Huntsman Chemical, 9.1 kilograms bisphenol-A sourced from Bayer, and adding 20 grams potassium carbonate catalyst sourced from Nicrom in a 5 gallon glass lined reactor. Heating the loaded charge to a temperature of 170° C. over 8 hours while stirring the load to produce 14.5 kilograms of propoxylated bisphenol-A branching agent. During this process $CO_2$ is produced that was vented through a condenser to atmosphere.

Propoxylated bisphenol-A was prepared by combining 8.4 kilograms propylene carbonate sourced from Huntsman Chemical, 9.1 kilograms bisphenol-A sourced from Bayer, and adding 20 grams potassium carbonate catalyst sourced from Nicrom in a 5 gallon glass lined reactor. Heating the loaded charge to a temperature of 170° C. over 8 hours while stirring the load to produce 13.8 kilograms of propoxylated bisphenol-A branching agent. During this process $CO_2$ is produced that was vented through a condenser to atmosphere.

Ethoxylated bisphenol-A was prepared by combining 7.2 kilograms ethylene carbonate sourced from Huntsman Chemical, 9.1 kilograms bisphenol-A sourced from Bayer, and adding 20 grams potassium carbonate catalyst sourced from Nicrom in a 5 gallon glass lined reactor. Heating the loaded charge to a temperature of 170° C. over 8 hours while stirring the load to produce 12.5 kilograms of propoxylated bisphenol-A branching agent. During this process $CO_2$ is produced that was vented through a condenser to atmosphere.

140.7 grams (0.445 moles) of the above-synthesized ethoxylated bisphenol-A, 273.1 grams (0.793 moles) of the above-synthesized propoxylated bisphenol-A, and 12.6 grams (0.033 moles) of the above-synthesized glycoxylated bisphenol-A were loaded to a 1 liter metal reactor equipped with heating mantle, stirrer, condenser and vacuum pump. To this load was added 130.4 grams (0.78 moles) terephthalic acid and 3 grams (0.01 moles) butyl(hydroxyl) stannanone. The apparatus was sealed and heated to 260° C. while 25"Hg of vacuum was applied to the reactor. As the monomers condensed in the reactor to form the pre-polymer, water was produced that was collected in the condenser. This reaction was run for 6 hours and then the reactor was left to cool. The next morning 92.1 grams (0.35 moles) dodecylsuccinic anhydride, 22.1 grams (0.19 moles) fumaric acid, 1 grams (0.005 moles) butyl(hydroxyl)stannanone, and 1 grams (0.009 moles) hydroquinone were added to the pre-polymer. The reactor was heated to 200° C. and the contents left to react for 19 hours until a softening point of 114° C. was obtained. At this point the contents of the reactor were removed, cooled and ground to a powder.

Example 2

Solvent-Free Emulsification of the Robust Resin of Example 1.

100 grams of the robust resin of Example 1 were blended with 10 grams of sodium dodecyl benzene sulfonate and 1 gram of sodium hydroxide. This mixture was then fed into an extruder at a rate of 15 grams/minute. The material melt-mixed in the first zone of the extruder at a temperature of 150° C. and then entered a second zone at 95° C. where water was pumped in through an injection nozzle at a rate of 30 grams/minute. These two streams were mixed in a Leistritz Micro-18 extruder to form a water-in-oil emulsion and later an oil-in-water emulsion. The latex was collected in a receiving tank for analysis. Latex samples were dried overnight and submitted to determine the resin molecular weight by gel permeation chromatography relative to polystyrene standards used to form the calibration curve of the chromatograph. The weight and number average molecular weights of the resin prior to dispersion were 15,600 and 3,800 grams/mol respectively. The dried latex had weight and number average molecular weight of 16,100 and 4,000 grams/mol respectively. Therefore, the resin did not degrade during the solvent-free extrusion process (the differences in Mw and Mn between feed resin and latex resin can be attributed to GPC measurement variation).

Example 3

Repeat Solvent-Free Emulsification of the Robust Resin of Example 1.

100 grams of the robust resin of Example 1 were blended with 10 grams of sodium dodecyl benzene sulfonate and 1 gram of sodium hydroxide This mixture was then fed into an extruder at a rate of 15 grams/minute. The material melt-mixed in the first zone of the extruder at a temperature of 150° C. and then entered a second zone at 95° C. where water was pumped in through an injection nozzle at a rate of 30 grams/minute. These two streams were mixed in a Leistritz Micro-18 extruder to form a water-in-oil emulsion and later an oil-in-water emulsion. The latex was collected in a receiving tank for analysis. Latex samples were dried overnight and submitted to determine the resin molecular weight by gel permeation chromatography relative to polystyrene standards used to form the calibration curve of the chromatograph. The weight and number average molecular weights of the resin prior to dispersion were 15,600 and 3,800 grams/mol respectively. The dried latex had weight and number average molecular weight of 14,100 and 3,600 grams/mol respectively. Therefore, the latex resin weight and number average molecular weights degraded by 10% and 5% respectively relative to the starting resin.

Table 2 summarizes the degradation for the resins and latexes of Examples 1-3 above following solvent-free emulsification on a Leistritz Micro-18 extruder.

TABLE 2

Degradation For Example Resins Following Solvent-Free Emulsification

| | Formulation | | Polymer | | | |
|---|---|---|---|---|---|---|
| | Neu- | Surfactant | Molecular Weight | | | |
| Example | tralizer (NaOH) (pph) | Dowfax ® 2A1 (pph) | Mw | % Mw De- graded | Mn | % Mn De- graded |
| Comparative 1A - Resin Prior To Solvent-Free Emulsification | -0- | -0- | 129500 | 0 | 5300 | 0 |
| Comparative 1B - Resin 1A Following Solvent-Free Emulsification | 1.0 | 10 | 62800 | 52 | 3800 | 28 |
| 1 | -0- | -0- | 15600 | 0 | 3800 | 0 |
| 2 | 1.0 | 1.0 | 16100 | −3 | 4000 | −5 |
| 3 | 1.0 | 10 | 14100 | 10 | 3600 | 5 |

The resin of Comparative Example 1A (Table 2, Row 1) is a branched resin which uses a trimellitic-anhydride monomer for branching. This resin has therefore in its backbone two carbonyl carbons separated by less than three atoms covalently linked by at least one double bond. Problematically, this polyester degraded heavily (52%) when subjected to the solvent-free emulsification process. As the two ester linkages are adjacent to one another in the backbone of the polymer, once one of the ester linkages has been hydrolyzed, it participates in a co-operative hydrolysis reaction that makes the second hydrolysis much faster.

The resin of Example 1 is the robust resin design of the present disclosure (Table 1, Row 3). When emulsified in the Leistritz-Micro 18 extruder, the resin of Example 1 degrades less than the resin of Comparative Example 1A.

In embodiments, the polyester resin herein exhibits less than about 20 percent molecular weight degradation following solvent-free emulsification, less than about 16 percent molecular weight degradation following solvent-free emulsification, less than about 15 percent molecular weight degradation following solvent-free emulsification, less than about 14 percent molecular weight degradation following solvent-free emulsification, less than about 12 percent molecular weight degradation following solvent-free emulsification, or less than about 6 percent molecular weight degradation following solvent-free emulsification. In certain embodiments, the polyester resin is substantially free of molecular weight degradation (that is, does not exhibit any molecular weight degradation) following solvent-free emulsification.

Solvent-free emulsification by extrusion is a new process/technology invented by Xerox Corporation. Solvent-free emulsification is useful for many applications, is cost-effective, and environmentally friendly (10% of the life cycle impact of current alternate technology). Resins have been described herein that are robust even when subjected to solvent-free emulsification. The resin and process herein enables the production of latexes from branched resins without molecular weight degradation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A branched polyester suitable for use in solvent-free emulsification, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the polyester comprises a compound of the formula:

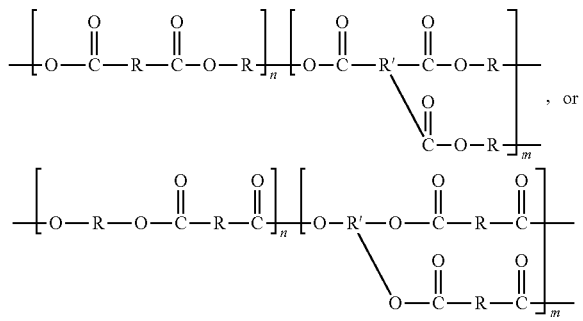

wherein R is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;
wherein m is an integer from about 1 to about 1,000; and
wherein n is an integer from about 1 to about 1,000; and
wherein branching is achieved by preparing the branched polyester with an acid monomer having three or more carboxylic acid groups.

2. The branched polyester of claim 1, wherein branching is achieved by preparing the branched polyester with an acid monomer selected from the group consisting of trimesic acid, biphenyl-3,4',5-tricarboxylic acid, 1,3,5-trimethylcyclohexane-1,3,5-tricarboxylic acid, cyclohexane-1,3,5-tricarboxylic acid, biphenyl-3,3',5,5'-tetracarboxylic acid, citric acid, tricarboxylic acid, butanetricarboxylic acid, nitrilotriacetic acid, and mixtures and combinations thereof.

3. A process for preparing the branched polyester of claim 1, comprising:
contacting at least one branching agent with at least one diacid, at least one diester, or a mixture or combination thereof, and reacting same to produce a branched polyester;
wherein the branching agent is an acid monomer having three or more carboxylic acid groups;
wherein the at least one branching agent is sufficient to provide acid-derived branching sites to the polyester that limit or prevent altogether degradation of the polyester during solvent-free emulsification processes such that the branched polyester exhibits less than about 20 percent molecular weight degradation following solvent-free emulsification.

4. The process of claim 3, wherein the branching agent is an acid monomer selected from the group consisting of trimesic acid, biphenyl-3,4',5-tricarboxylic acid, 1,3,5-trimethylcyclohexane-1,3,5-tricarboxylic acid, cyclohexane-1,3,5-tricarboxylic acid, biphenyl-3,3',5,5'-tetracarboxylic acid, citric acid, tricarballylic acid, butanetricarboxylic acid, nitrilotriacetic acid, and mixtures and combinations thereof.

5. The process of claim 3, wherein the branched polyester is substantially free of molecular weight degradation following solvent-free emulsification.

6. A solvent-free emulsification process for preparing polyester latex comprising:
contacting a branched polyester with a solid neutralizing agent in the absence of an organic solvent to form a pre-blend mixture;
melt mixing the mixture;
contacting the melt mixed mixture with deionized water to form an oil in water emulsion;
optionally, recovering polyester latex particles;
wherein the branched polyester comprises a branched polyester suitable for use in solvent-free emulsification, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the polyester comprises a compound of the formula:

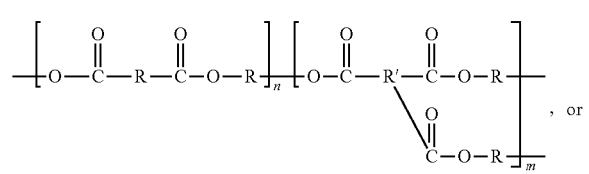, or

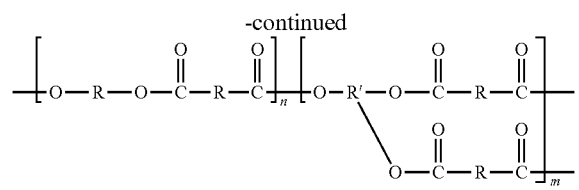

wherein R is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;
wherein R' is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;
wherein all carbonyl carbons adjacent to R' are separated by at least two atoms if the two atoms are separated by a single bond; or
wherein all carbonyl carbons adjacent to R' are separated by at least 3 atoms covalently linked in series;
wherein m is an integer from about 1 to about 1,000; and
wherein n is an integer from about 1 to about 1,000; and
wherein branching is achieved by preparing the branched polyester with an acid monomer having three or more carboxylic acid groups.

7. A polyester latex prepared by a solvent-free emulsification process comprising:
contacting a branched polyester with a solid neutralizing agent in the absence of an organic solvent to form a pre-blend mixture;
melt mixing the mixture;
contacting the melt mixed mixture with deionized water to form an oil in water emulsion;
optionally, recovering polyester latex particles;
wherein the branched polyester comprises a branched polyester suitable for use in solvent-free emulsification, the branched polyester having a first original weight average molecular weight before undergoing solvent-free emulsification and a second weight average molecular weight after undergoing solvent-free emulsification, wherein the branched polyester has a structure that limits degradation of the polyester during solvent-free emulsification to less than about 20 percent of the first original weight average molecular weight, wherein the polyester comprises a compound of the formula:

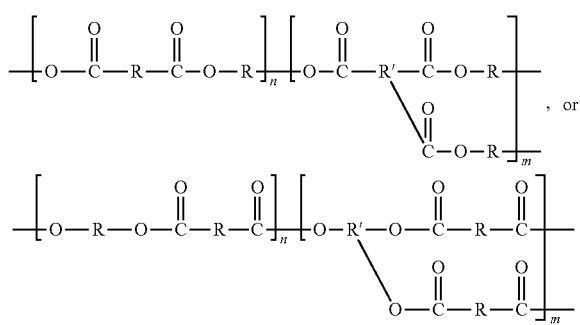

wherein R is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group is selected from the group consisting of linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000; and wherein branching is achieved by preparing the branched polyester with an acid monomer having three or more carboxylic acid groups.

8. The branched polyester of claim 1, wherein the polyester comprises a compound of the formula:

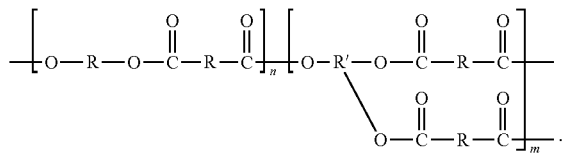

9. The branched polyester of claim 1, wherein the branched polyester contains acid-derived branching sites, wherein branching is achieved by preparing the branched polyester with a branching agent consisting of an acid monomer having three or more carboxylic acid groups.

10. The process of claim 3, wherein the at least one branching agent consists of an acid monomer having three or more carboxylic acid groups.

11. The branched polyester of claim 1, wherein the branched polyester is substantially free of molecular weight degradation following solvent-free emulsification.

* * * * *